United States Patent

May et al.

[11] 4,055,710
[45] Oct. 25, 1977

[54] ELECTROCHEMICAL CELLS HAVING SOLID ELECTROLYTE OF TUBULAR FORM

[75] Inventors: Geoffrey John May, Frodsham; Michael McNamee, Wallasey, both of England

[73] Assignee: Chloride Silent Power Limited, London, England

[21] Appl. No.: 728,679

[22] Filed: Oct. 1, 1976

[51] Int. Cl.² .................................................. H01M 10/39
[52] U.S. Cl. ....................................... 429/104; 429/122
[58] Field of Search .................. 429/104, 191, 122, 31

[56] References Cited

U.S. PATENT DOCUMENTS

| | | | |
|---|---|---|---|
| 3,413,150 | 11/1968 | Kummer et al. | 429/104 X |
| 3,841,912 | 10/1974 | Kagawa et al. | 429/104 |

Primary Examiner—Anthony Skapars
Attorney, Agent, or Firm—Beveridge, DeGrandi, Kline, Lunsford

[57] ABSTRACT

In an electrochemical cell, such as a sodium-sulphur cell, having a tube of solid electrolyte material separating a liquid alkali metal from a cathodic reactant, the electrolyte tube is surrounded by constraining means which apply an inward pressure as the cell temperature rises. This is achieved either by having a suitable means, e.g., wire, around the tube with a lower coefficient of expansion than the tube, or by putting powder or particles or corrugated metal or other constraining means between the tube and a surrounding housing, the materials being chosen to have appropriate coefficients of expansion to give the required inward pressure.

27 Claims, 5 Drawing Figures

ELECTROCHEMICAL CELLS HAVING SOLID ELECTROLYTE OF TUBULAR FORM

BACKGROUND OF THE INVENTION

This invention relates to electrochemical cells having solid electrolyte of tubular form separating a liquid alkali metal forming an anode from a liquid cathodic reactant. Such cells operate at an elevated temperature, typically above 200° C. A sodium-sulphur cell, which normally operates between 300° and 350° C but which may operate between 270° and 400° C is a well known example of a cell having solid electrolyte.

The electrolyte material is a material through which ions of the alkali metal can migrate. A number of such solid electrolyte materials are known; in the case of sodium-sulphur cells; it is the usual practice to employ β-alumina ceramic material. This material like other known solid electrolytes has only a limited mechanical strength and one of the principal courses of cell failure is the breakage of the electrolyte tube. Quite apart from the loss of the cell in a battery due to the breakage of a tube, there is also a possibility of risk of damage to surrounding equipment or personnel in the event of an electrolyte breakage if there is sudden mixing of a large quantity of liquid alkali metal with the cathodic reactant.

SUMMARY OF THE INVENTION

The present invention is concerned with increasing the resistance of the tubular electrolyte material against breakage due to hoop stress. The coefficient of linear expansion of β-alumina is about $7 \times 10^{-6} K^{-1}$ and differential thermal expansion between, for example a solid central cathode current collector which has a relatively high thermal expansion coefficient and the electrolyte tube will subject the electrolyte to tensile hoop stresses on warm-up of a cold cell to its operating temperature. In a sodium sulphur cell, it is preferred to have a central cathode but similar problems would arise if a solid central anode were used. The electrolyte will also be stressed in the region of the seal both as a result of the compressive forces exerted by the seal and from differential movement between the seal components caused by changes in cell temperature.

According to this invention, in a cell having a tubular housing containing a tube of solid electrolyte material separating the alkali metal from a cathodic reactant, constraining means are provided around the electrolyte tube, the constraining means having a coefficient of thermal expansion such as to provide an increasing inward pressure on the electrolyte tube as the temperature rises. By this construction, the electrolyte tube can be put in compression at the operating temperature. The increasing pressure as the temperature rises reduces the possibility of the tube bursting under hoop stress. The constraining means may be initially pre-stressed so as to apply an inward pressure at room temperature.

The constraining means, in the simplest form, may comprise means, e.g., a wire, around the tube having a coefficient of thermal expansion less than that of the tube. It is often convenient however to make use of the fact that there is necessarily an outer housing around the tube and thus, in one form of the invention there is provided in the annular region between the housing and the electrolyte tube, a material either in powder form or shaped to be deformable under pressure in radial directions, which material has a higher coefficient of expansion than the material of the housing so that, as the temperature of the cell is increased, pressure in the radial direction is applied by this material on to the electrolyte tube. This material thus applies a pressure to counter hoop stress to the electrolyte tube, which pressure increases as the temperature rises. The cell may be constructed initially so that the electrolyte is prestressed at room temperature.

In a sodium-sulphur cell, it is preferred to have the cathodic reactant, that is the sulphur-containing material, within the electrolyte tube and to have the sodium around the outside of the electrolyte tube. Such a construction permits of the use of a metallic housing containing the sodium. It is possible to use then a relatively low expansion housing, for example a low expansion iron nickel alloy or a ferritic stainless steel. Other low expansion metals and alloys suitable for the housing and which are resistant to sodium attack include Cobalt ($\alpha = 14 \times 10^{-6} K^{-1}$) and some of its alloys, Nickel ($\alpha = 13 \times 10^{-6} K^{-1}$) and some of its alloys, Niobium ($\alpha = 7 \times 10^{-6} K^{-1}$) and some of its alloys, Molybdenum ($\alpha = 6 \times 10^{-6} K^{-1}$) and Zirconium ($\alpha = 6 \times 10^{-6} K^{-1}$) and some of its alloys, certain iron-nickel-cobalt alloys and plain carbon steel ($\alpha = 11 \times 10^{-6} K^{-1}$) protected from attack by sodium by a suitable surface coating. In the above, the symbol $\alpha$ indicates the coefficient of thermal expansion. In this case, the material within the annular region around the electrolyte tube, may comprise one or more elements of a relatively high expansion alloy, for example stainless steel, arranged around the electrolyte tube, each element being deformable in the radial direction. Other materials with a high thermal expansion coefficient include aluminium ($\alpha = 23 \times 10^{-6} K^{-1}$) and its alloys, copper ($\alpha = 17 \times 10^{-6} K^{-1}$) and some of its alloys. In addition some of the materials mentioned above for the housing may be used in combination with a cell case having a very low thermal expansion coefficient. Aluminium and copper are both resistant to attach by liquid sodium.

In one convenient form of construction an annular element of stainless steel is provided which element is essentially of a corrugated form with the corrugations extending to and fro across the annular region between the electrolyte tube and the housing. Such an element may be similar in shape to a ruffle and, for this reason, it is convenient to refer to the element as a ruffle. It will be appreciated however that the shaping of the element is not critical so long as it permits of deformation in the radial direction, the expansion on heating causing pressure to be applied in the radial direction the element deforming where necessary so as to accommodate itself to the space available.

If a ruffle formed of sheet material is employed, the material may be perforate to facilitate flow of the alkali metal.

Preferably, if a ruffle is formed of sheet material, it is shaped, for example to form two or more rows of substantially cylindrical portions, so that it will readily provide the required stress due to radial pressure. In some cases it may be convenient to form the annular element from an array of cylinders, which may be separate cylinders packed in the annular region around the electrolyte tube.

If a powder is employed, it is possible to use any material which will withstand the conditions and which has a suitable coefficient of thermal expansion. As explained above, it is preferred in a sodium-sulphur cell to have the sodium in the annular region around the outside of the electrolyte tube and thus the material would have to be inert to liquid sodium and have a coefficient of thermal expansion greater than that of the housing of the cell. The use of a powder has the advantage of facilitating the assembly of the cell. It would also be possible to pack the annulus with sufficient powder to prestress the electrolyte at room temperature. The powder would assist in forming a wick for the liquid sodium material to ensure that the broad surface of the electrolyte tube is kept wetted by liquid sodium. Also the powder would act as a sodium flow limiter in the event of a catastrophic electrolyte failure. The packed powder moreover would help to inhibit seal extrusion and the packing would reduce the tensile bending stresses caused by the compressive forces of a seal at the end of the electrolyte tube.

Suitable materials for use as such a powder include powdered metal of the materials suggested above for a ruffle. It is also possible to use non-metallic, ceramic or vitreous materials as a high expansion powder in a low expansion cell. The alkali or alkaline earth halides may be suitable; for example calcium fluoride combines a high theral expansion coefficient ($19 \times 10^{-6} K^{-1}$) and a high elastic modulus with resistance chemically to liquid sodium.

Both powder as described above or the ruffle would support the electrolyte tube within the cell, which would be advantageous for a cell used for motive power applications on vehicles, where the electrolyte would be stressed as a result of acceleration or deceleration.

As previously indicated, in another construction, reinforcement of the electrolyte tube to increase the hoop stress on heating may be effected by providing hoops or a winding of material around the electrolyte tube which material has a lower coefficient of expansion than the electrolyte material. Conveniently such reinforcement is effected by winding one or more wires around the electrolyte tube. With this arrangement, differential thermal movement occurring between ambient temprature and the cell operating temperature would place the electrolyte in compression as before thus effectively reinforcing it against any tensile hoop stress. One very suitable material for winding around the electrolyte tube in a sodium-sulphur cell comprises carbon fibre material. Oriented carbon fibres made by graphitising an organic fibre precursor, such as polyacrylonitrile, contract along the fibre axis on being raised in temperature, in other words the thermal expansion coefficient is negative. Such materials also have a high elastic moduli. Such wires could be used in a sodium-sulphur cell having a central sodium electrode since the carbon fibre material could be used in the cathodic reactant. In a cell having sodium around the outside of the electrolyte tube, a wire of low-expansion nickel iron or nickel iron cobalt alloy or carbon fibres or filaments of glass of suitable composition having a suitably low coefficient of thermal expansion and chemically resistant to sodium could be wound around the electrolyte tube to reinforce it.

In another construction, a perforated sheet of low-expansion material is wrapped around the electrolyte tube; provided the coefficient of expansion of the sheet material is less than that of the electrolyte tube, the tube will be put in compression as the temperature rises thereby enabling the required compressive stress to be developed at the operating temperature. In a sodium-sulphur cell having the sodium around the outside of the electrolyte tube, this perforated sheet may be arranged to act as a wick for keeping the outer surface of the tube covered with sodium.

DESCRIPTION OF THE PREFERRED EMBODIMENTS

Figure 1:
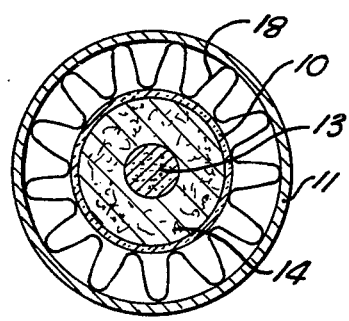
FIGS. 1 to 5 are each a diagrammatic cross-section through a sodium-sulphur cell.

Referring to FIG. 1 there is shown diagrammatically a sodium-sulphur cell comprising an electrolyte tube 10 of β-alumina coaxially arranged within a cylindrical housing 11 of, for example, low expansion iron-nickel alloy of ferritic stainless steel. This particular cell has the cathodic reactant, comprising sulphur and the polysulphide materials which are formed on discharge of the cell, within the electrolyte tube 10. To provide electronic conduction to the cathode there is a central graphite current collector rod 13 with graphite or carbon felt 14 extending between the current collector rod and the electrolyte tube. The annular region between the electrolyte tube 10 and housing 11 is filled with sodium which is liquid at the operating temperature of the cell. In order to increase the hoop stress in the electrolyte tube on heating the cell, in the arrangement of FIG. 1, a ruffle 18 formed of stainless steel is provided. This ruffle is essentially a corrugated sheet with the corrugations extending to and from across the annular region of the electrolyte tube to the housing. FIG. 1 shows a simple form of ruffle in which the corrugations are substantially sinusoidal in form. The material must have a high enough coefficient of expansion compared with that of the housing 11 such that the pressure on the electrolyte tube increases as the temperature rises. The shape of the ruffle permits of deformation in the radial direction and hence differential thermal expansion will cause an increase in pressure on the electrolyte tube. The magnitude of this pressure is determined by the coefficient of expansion of the material and the relationship between radial pressure and deformation which relationship depends on the shaping and thickness of the material.

Figure 2:
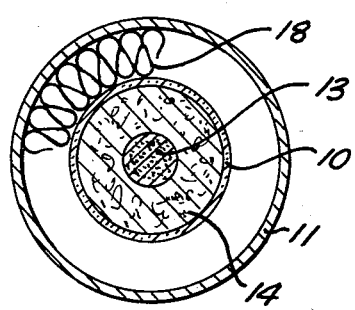

FIG. 2 shows a modification of the arrangement of FIG. 1 in which the shaping of the ruffle is such as to bring the various adjacent corrugations into contact thereby avoiding any tendency for a corrugation to bend over completely on compression.

Figure 3:
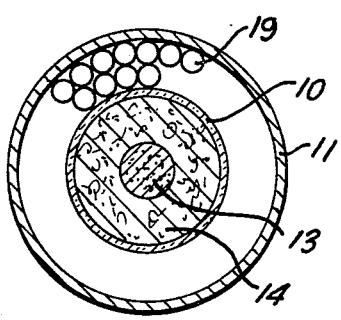

It will be seen that the ruffle of FIG. 2 is very similar to a series of cylindrical elements and it is possible, as shown in FIG. 3, to make use of cylindrical elements 19 arranged in the annular region between the electrolyte tube 10 and the outer housing 11.

Figure 4:
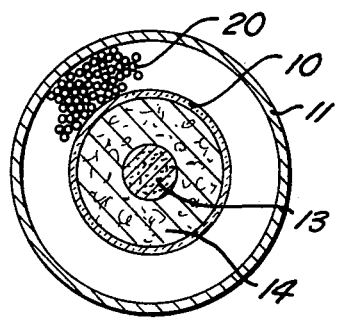

FIG. 4 shows another form of construction in which the annular region between the electrolyte tube 10 and the outer housing 11 is packed with a powder material 20, the material being chosen to have a coefficient of thermal expansion sufficiently large compared with that of the outer housing to ensure that pressure is applied to the electrolyte tube as the temperature rises.

Figure 5:
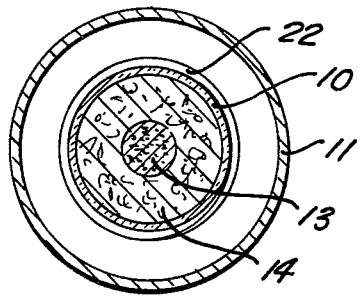

FIG. 5 shows another construction in which a wire 22 is wound around the electrolyte tube 10. This wire has a smaller coefficient of expansion than the material of the electrolyte tube so as to ensure that the tube is placed under compression as the temperature rises. In the case of a cell having a central cathode as shown, the wire may be formed of a lower expansion iron-nickel or iron-nickel-cobalt alloy or of filaments of a suitable glass or of filaments or oriented carbon fibre material.

This arrangement using wire wound tightly around the electrolyte tube may also be used with a cell having a central anode and having the cathodic reactant, that is the sulphur-containing material, in the annular region between the electrolyte tube and the housing. In this latter case, the wire would have to be of a material to withstand the conditions in the cathodic region; conveniently oriented carbon fibre material is employed. The wire may be put round the electrolyte tube as a helix extending on the length of the tube or as a series of hoops spaced along the length of the tube so that the compressive stress in the circumferential direction in the tube is applied substantially uniformly over the whole of the tube. Each end of the wire may be secured, e.g., to the other end of the wire or to another turn on the wire in such a way as to ensure that the hoops or helix remain tight around the ceramic tube.

In another construction, perforated sheet metal is wrapped around the electrolyte tube at room temperature, metal being chosen to have a coefficient of expansion less than that of the electrolyte tube, so that, when the cell is brought up to the normal operating temperature, the electrolyte is subjectd to a compressive stress.

We claim:

1. An electrochemical cell having a tube of solid electrolyte material separating a liquid alkali metal from a cathodic reactant, wherein constraining means are provided around the electrolyte tube, the constraining means having a coefficient of thermal expansion such as to provide an increasing inward pressure on the electrolyte tube as the temperature rises.

2. An electrochemical cell as claimed in claim 1 wherein the constraining means are initially pre-stressed so as to apply an inward pressure at room temperature.

3. An electrochemical cell as claimed in claim 1 wherein said constraining means comprise means extending completely around the tube and having a coefficient of thermal expansion less than that of the tube.

4. An electrochemical cell as claimed in claim 3 wherein the constraining means comprise wire around the electrolyte tube.

5. An electrochemical cell as claimed in claim 1 and having an outer housing around the tube wherein there is provided, in the annular region between the housing and the electrolyte tube, a material in powder form, which material has a higher coefficient of expansion than the material of the housing so that, as the temperature of the cell is increased, pressure in the radial direction is applied by this material on to the electrolyte tube.

6. A sodium-sulphur cell comprising a beta-alumina tube forming a solid electrolyte separating a sulphur-containing cathodic reactant from liquid sodium and having constraining means around the beta-alumina tube with a coefficient of thermal expansion less than that of the beta-alumina so that an increasing inward pressure is applied on the beta-alumina tube as the temperature rises and so thereby putting the tube in compression at its operating temperature.

7. A sodium-sulphur cell as claimed in claim 6 and having cathodic reactant within the electrolyte tube and the sodium in a housing around the outside of the electrolyte tube wherein the housing is a tubular housing formed of a metal having a relatively low coefficient of thermal expansion and wherein the annular region between the housing and the electrolyte tube contains at least one element of a material having a relatively high coefficient of thermal expansion, the difference of the coefficients of thermal expansion of the housing and the element being such that said element tends to expand radially inwardly as the temperature increases, said element exerts inward pressure on the surface of the electrolyte tube.

8. A sodium-sulphur cell as claimed in claim 7 wherein the housing is formed of a material selected from the group consisting of ferritic stainless steel and a low-expansion iron-nickel alloy.

9. A sodium-sulphur cell as claimed in claim 7 wherein the housing is formed of a material selected from the group consisting of cobalt, nickel, niobium, molybdenum, zirconium and an alloy containing at least one of these materials and resistant to attack by molten sodium.

10. A sodium-sulphur cell as claimed in claim 7 wherein the housing is formed of an iron-nickel-cobalt alloy.

11. A sodium-sulphur cell as claimed in claim 7 wherein the housing is formed of carbon steel having a surface coating for protection against attack by sodium.

12. A sodium-sulphur cell as claimed in claim 7 wherein the said element in said annular region is formed of a metal which is chemically resistant to attack by sodium.

13. A sodium-sulphur cell as claimed in claim 7 wherein the metal element in said annular region is formed of a material selected from the group consisting of aluminum and copper.

14. A sodium-sulphur cell as claimed in claim 12 wherein the metal element in said annular region is formed of a material selected from the group consisting of an alloy of aluminum and an alloy of copper which is resistant to attack by sodium.

15. A sodium-sulphur cell as claimed in claim 6 wherein said element in said annular region is an annular element extending around the electrolyte tube and of corrugated form with the corrugations extending to a fro across the annular region between the electrolyte tube and the housing.

16. A sodium-sulphur cell as claimed in claim 15 wherein said element is formed of sheet metal and is perforated to facilitate flow of the sodium.

17. A sodium-sulphur cell as claimed in claim 15 wherein the corrugations are shaped to form two or more rows of substantially cylindrical portions, each row extending around the annular region.

18. A sodium-sulphur cell as claimed in claim 6 wherein there are a plurality of said elements, said elements being cylinders extending parallel to the axis of the electrolyte tube in the annular region between the electrolyte tube and the housing.

19. A sodium-sulphur cell as claimed in claim 6 wherein said elements are constituted by a powder in the annular region between the electrolyte tube and the housing.

20. A sodium-sulphur cell as claimed in claim 19 wherein the powder is packed into the annular region between the housing and the electrolyte tube so as to pre-stress, into compression, the electrolyte at room temperature.

21. A sodium-sulphur cell as claimed in claim 6 wherein the constraining means comprises hoops of material with a lower coefficient of expansion than the beta-alumina around the electrolyte tube along the length thereof.

22. A sodium-sulphur cell as claimed in claim 6 wherein the constraining means comprises flexible material with a lower coefficient of thermal expansion than that of the beta-alumina wound around the electrolyte tube along the length thereof.

23. A sodium-sulphur cell as claimed in claim 21 wherein the constraining means comprise metal wire.

24. A sodium-sulphur cell as claimed in claim 21 wherein the constraining means comprise carbon fibre material.

25. A sodium-sulphur cell as claimed in claim 21 wherein the constraining means comprise filaments of sodium-resistant glass having a lower coefficient of thermal expansion than the beta-alumina electrolyte.

26. A sodium-sulphur cell as claimed in claim 6 wherein the constraining means comprises perforated sheet metal wrapped around the electrolyte tube.

27. An electrochemical cell as claimed in claim 1 and having an outer housing around the tube, wherein there is provided, in the annular region between the housing and the electrolyte tube, a material shaped to be deformable under pressure in radial directions, which material has a higher coefficient of expansion than the material of the housing so that, as the temperature of the cell is increased, pressure in the radial direction is applied by this material on the electrolyte tube.

* * * * *